United States Patent
Yoshimura et al.

(10) Patent No.: US 12,127,493 B2
(45) Date of Patent: Oct. 29, 2024

(54) WORKING MACHINE

(71) Applicant: KUBOTA CORPORATION, Osaka (JP)

(72) Inventors: Fumiya Yoshimura, Sakai (JP); Kotaro Yamaguchi, Sakai (JP); Kenji Tamatani, Sakai (JP); Takanori Morimoto, Sakai (JP); Ken Sakuta, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 310 days.

(21) Appl. No.: 17/746,118

(22) Filed: May 17, 2022

(65) Prior Publication Data

US 2022/0272889 A1 Sep. 1, 2022

Related U.S. Application Data

(63) Continuation of application No. PCT/JP2020/046377, filed on Dec. 11, 2020.

(30) Foreign Application Priority Data

Dec. 18, 2019 (JP) .................. 2019-228665

(51) Int. Cl.
*A01B 69/00* (2006.01)
*B62D 49/06* (2006.01)
*G05D 1/00* (2024.01)

(52) U.S. Cl.
CPC ......... *A01B 69/004* (2013.01); *G05D 1/0219* (2013.01); *B62D 49/06* (2013.01)

(58) Field of Classification Search
CPC .. A01B 69/004; A01B 69/008; G05D 1/0219; G05D 1/027; G05D 1/0278; B62D 49/06
See application file for complete search history.

(56) References Cited

U.S. PATENT DOCUMENTS 4,558,760 A   12/1985   Lestradet
5,187,662 A   2/1993   Kamimura et al.
(Continued)

FOREIGN PATENT DOCUMENTS

EP   3 165 985 A1   5/2017
JP   2017-060524 A   3/2017
(Continued)

OTHER PUBLICATIONS

Official Communication issued in International Patent Application No. PCT/JP2020/046377, mailed on Mar. 2, 2021.
(Continued)

*Primary Examiner* — Isaac G Smith
*Assistant Examiner* — Nikki Marie M Molina
(74) *Attorney, Agent, or Firm* — Keating & Bennett, LLP

(57) ABSTRACT

A working machine includes a machine body capable of traveling, a position detector to detect a position of the machine body, and a controller to control the machine body based on the position of the machine body detected by the position detector and a planned travel route. The planned travel route includes a straight section on which the machine body travels straight, and the controller includes a threshold setter to set a threshold according to work, and causes the machine body to perform a recovery movement to make a deviation between the position of the machine body detected by the position detector and the planned travel route less than the threshold when the machine body is at a start point of the straight section or is about to enter the start point of the straight section.

6 Claims, 10 Drawing Sheets

(56) References Cited

U.S. PATENT DOCUMENTS

2018/0310461 A1* 11/2018 Shinkai ................ A01B 69/008
2018/0373257 A1* 12/2018 Runde .................. G05D 1/0278
2019/0208695 A1*  7/2019 Graf Plessen ....... A01B 69/008

FOREIGN PATENT DOCUMENTS

| JP | 2018-185671 A | 11/2018 |
| JP | 2019-126280 A | 8/2019 |
| WO | 2016/002082 A1 | 1/2016 |

OTHER PUBLICATIONS

Official Communication issued in corresponding European Patent Application No. 20901104.8, mailed on Oct. 27, 2023.

* cited by examiner

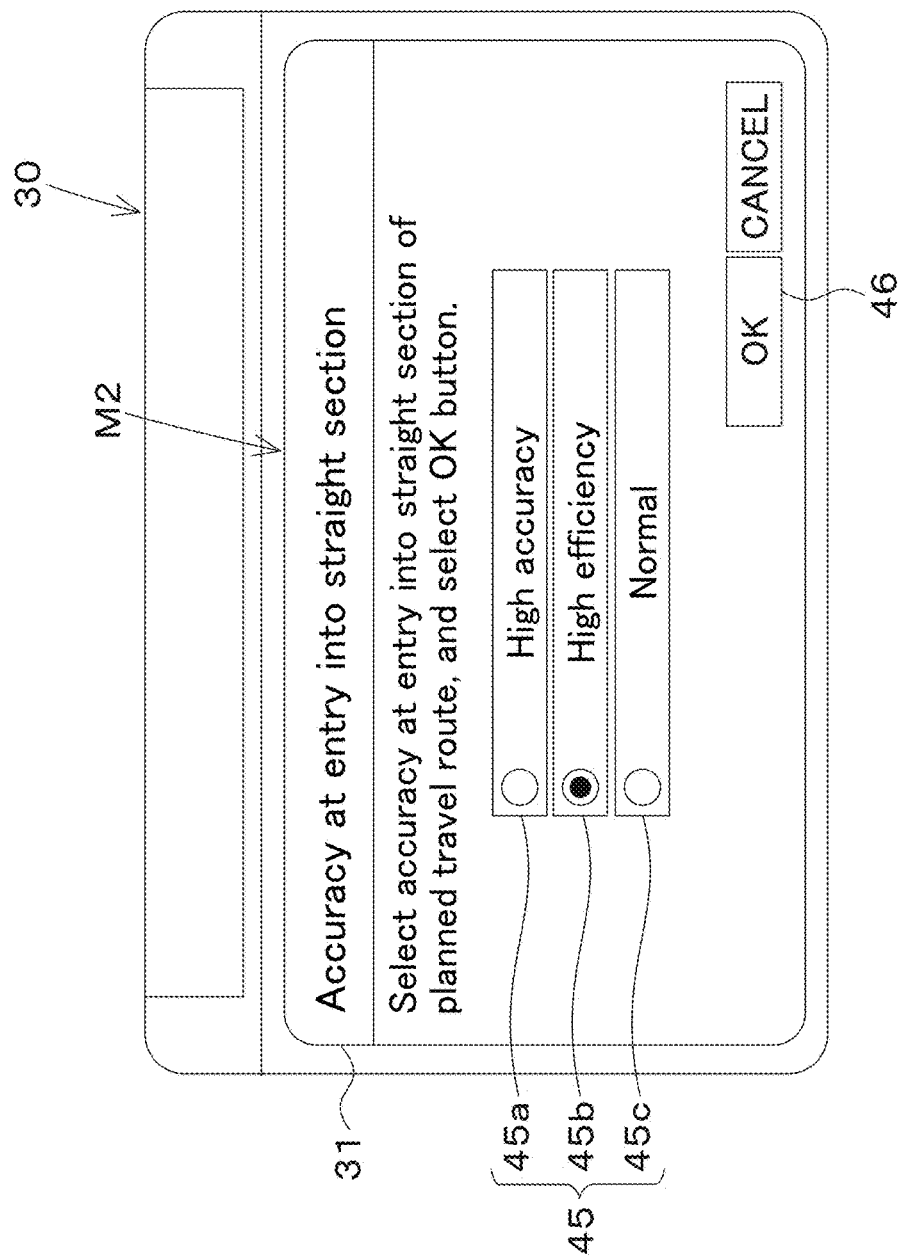

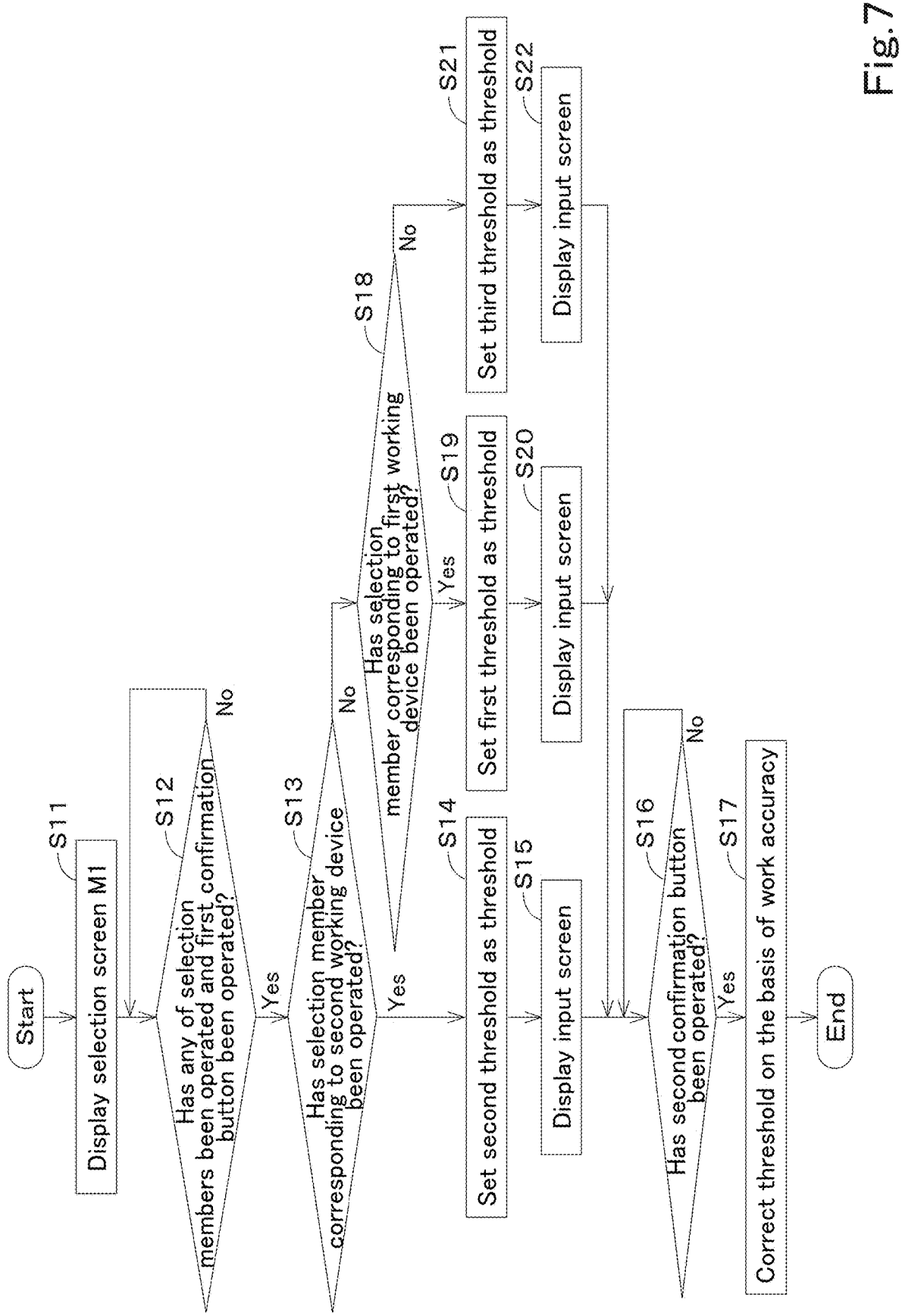

WORKING MACHINE

CROSS REFERENCE TO RELATED APPLICATIONS

This application is a continuation application of International Application No. PCT/JP2020/046377, filed on Dec. 11, 2020, which claims the benefit of priority to Japanese Patent Application No. 2019-228665, filed on Dec. 18, 2019. The entire contents of each of these applications are hereby incorporated herein by reference.

BACKGROUND OF THE INVENTION

1. Field of the Invention

The present invention relates to a working machine which travels according to a planned travel route.

2. Description of the Related Art

Conventionally, a working machine disclosed in Japanese Unexamined Patent Application Publication No. 2019-126280 includes a machine body capable of traveling, a working device mounted on the machine body, a position detecting device to detect the position of a machine body, and a control device to control the machine body based on the position of the machine body detected by the position detecting device and a planned travel route.

The working machine of Japanese Unexamined Patent Application Publication No. 2019-126280 is capable of traveling along a planned travel route.

However, the control device performs control so that the deviation between the machine body and the planned travel route is eliminated both in the case where travel accuracy is required given the type of work done by the working device and in the case where the travel accuracy is not required given the type of the work. Therefore, work efficiency may decrease in the case of work for which accuracy is not required.

SUMMARY OF THE INVENTION

Preferred embodiments of the present invention provide working machines each being capable of efficiently traveling according to work accuracy.

A working machine according to an aspect of a preferred embodiment of the present invention includes a machine body capable of traveling, a position detector to detect a position of the machine body, and a controller to control the machine body based on the position of the machine body detected by the position detector and a planned travel route, wherein the planned travel route includes a straight section on which the machine body travels straight, and the controller is configured or programmed to include a threshold setter to set a threshold according to work, and cause the machine body to perform a recovery movement to make a deviation between the position of the machine body detected by the position detecting device and the planned travel route less than the threshold when the machine body is at a start point of the straight section or is about to enter the start point of the straight section.

The working machine further includes at least one selector via which the work is capable of being selected, wherein the threshold setter sets the threshold according to the work selected via the at least one selector.

First work and second work for which less work accuracy is required than for the first work are capable of being selected via the at least one selector. The threshold setter is configured or programmed to set a first threshold as the threshold upon selection of the first work via the at least one selector, and a second threshold as the threshold upon selection of the second work via the at least one selector, the second threshold being greater than the first threshold.

The first work includes spreading work done by a spreader and the second work includes work against a ground done by a ground implement.

The first work includes seeding work done by a seeder, and the second work includes fertilization work done by a fertilizer spreader and/or stubble cultivation performed by a stubble cultivator.

The working machine further includes an input capable of receiving input of accuracy of the work, wherein the threshold setter sets the threshold according to the work and corrects the threshold according to the accuracy of the work inputted into the input.

The recovery movement is a movement in which the machine body makes a three-point turn.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6B illustrates an example of an accuracy selection screen displayed on the display unit.

FIG. 7 is a chart showing a flow in which a threshold setting unit sets a threshold.

DETAILED DESCRIPTION OF THE PREFERRED EMBODIMENTS

Figure 1:
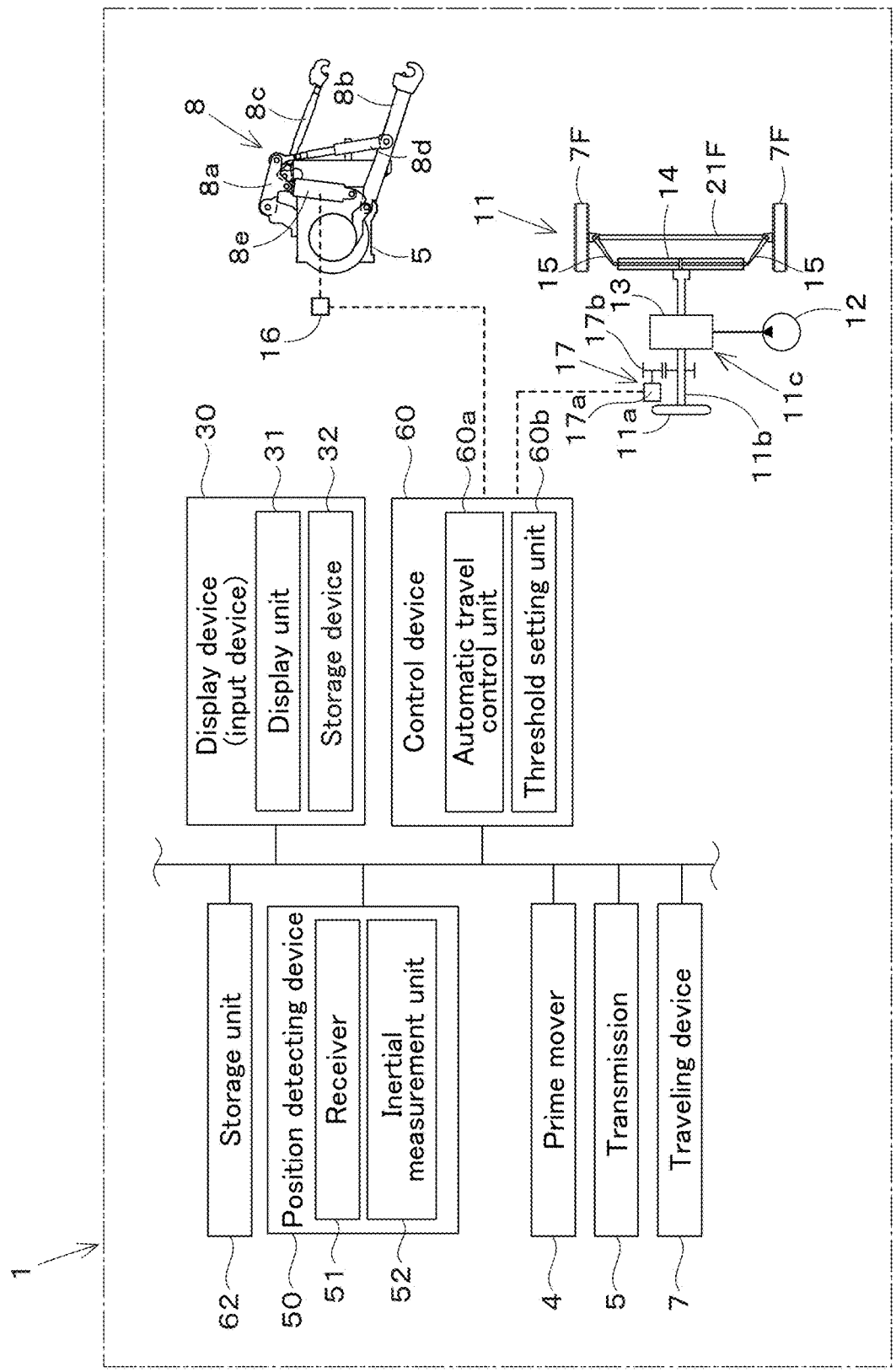
FIG. 1 is a block diagram of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description describes preferred embodiments of the present invention with reference to drawings.

Figure 8:
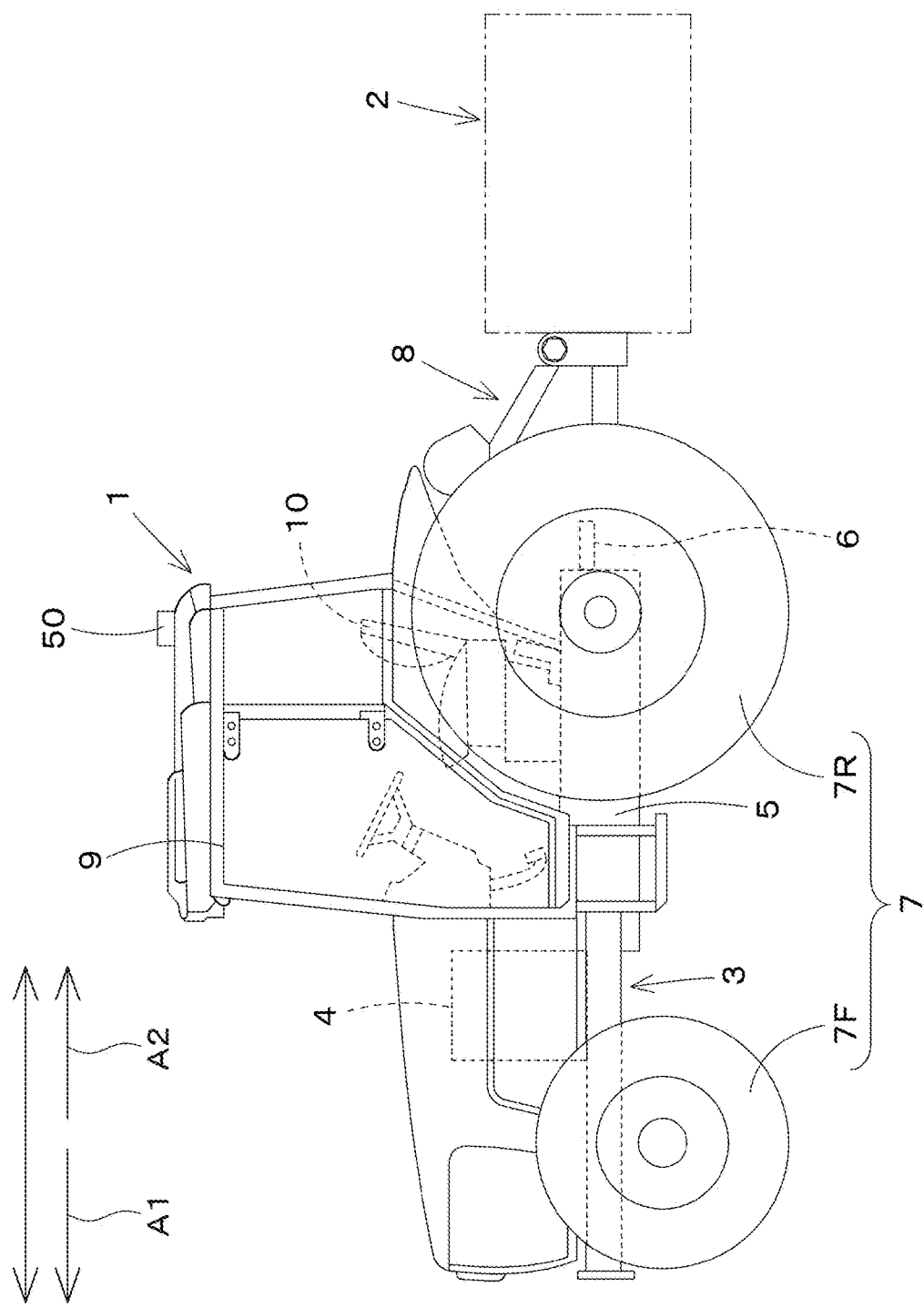
FIG. 8 is a general side view of the working machine.

First, a working machine 1 is discussed. The working machine 1 includes a working device 2 to do work, and is, for example, an agricultural machine such as a tractor, a combine, or a rice transplanter. The present preferred embodiment is discussed based on the assumption that the working vehicle 1 is a tractor, for example. As illustrated in FIG. 8, the working machine 1 includes a machine body (travel vehicle) 3 capable of traveling, a prime mover 4, a transmission 5, and the working device 2. The machine body 3 is provided with an operator's seat 10. In the following description, the front of the working machine 1 (as indicated by arrow A1 in FIG. 8) as seen from an operator seated on the operator's seat 10 is "front", the rear of the working machine 1 (as indicated by arrow A2 in FIG. 8) as seen from the operator is "rear", the left side of the working machine 1 (near side in FIG. 8) as seen from the operator is "left", and the right side of the working machine 1 (far side in FIG. 8) as seen from the operator is "right".

The machine body 3 includes a traveling device 7. The traveling device 7 includes wheels which rotate (front wheel(s) 7F and rear wheel(s) 7R). The front wheels 7F may be tire-shaped wheels or may be crawler-shaped wheels. The rear wheels 7R also may be tire-shaped wheels or may be crawler-shaped wheels.

The prime mover 4 is a diesel engine, an electric motor, and/or the like. The transmission 5 is capable of changing driving forces for the traveling device 7 by changing speed stages and switching the traveling state of the traveling device 7 between forward and rearward traveling states. In the present preferred embodiment, the transmission 5 is a continuously variable transmission, in particular, a hydraulic mechanical transmission (HMT). The machine body 3 includes an output shaft (PTO shaft) 6 which transmits power from the prime mover 4. The output shaft 6 projects rearward from the rear of the machine body 3.

Furthermore, as illustrated in FIG. 8, the machine body 3 includes a raising/lowering device 8 to which the working device 2 can be detachably attached and which is capable of raising and lowering the working device 2. Specifically, the machine body 3 is provided with, at the rear thereof, the raising/lowering device 8 including a three-point linkage or the like. This makes it possible to link the working device 2 to the machine body 3. By linking the working device 2 to the raising/lowering device 8, it is possible to allow the machine body 3 to tow the working device 2.

The working device 2 is mounted on the machine body 3 via, for example, the raising/lowering device 8. The working device 2 is a digger for digging potatoes and/or carrots, a spreader such as a fertilizer spreader (fertilizing device) for spreading fertilizer or an agricultural chemical spreader for spreading agricultural chemicals, a seeder for seeding on an agricultural field, a harvester for harvesting, a digger for mowing grass or the like, a tedder for tedding grass or the like, a rake for raking grass or the like, a baler for baling grass or the like, a ground implement which does work against an agricultural field, or the like. The ground implement encompasses a stubble cultivator for stubble cultivation, a harrow for puddling, a cultivator (rotary cultivator) for cultivating work, and the like.

As illustrated in FIG. 1, the working machine 1 includes a steering unit 11. The steering unit 11 includes a steering wheel 11a, a rotation shaft (steering shaft) 11b which rotates as the steering wheel 11a rotates, and an assist mechanism (power steering mechanism) 11c to assist steering performed using the steering wheel 11a. The assist mechanism 11c includes a hydraulic pump 12, a control valve 13 supplied with hydraulic fluid discharged from the hydraulic pump 12, and a steering cylinder 14 which is caused to function by the control valve 13. The control valve 13 is a solenoid valve which functions according to a control signal. The control valve 13 is, for example, a three-way switching valve which achieves multi-position switching by movement of a spool or the like. The positions of the control valve 13 can also be switched by rotation of the rotation shaft 11b. The steering cylinder 14 is connected to arms (knuckle arms) 15 which change the orientation of the front wheels 7F.

Therefore, upon operation of the steering wheel 11a, the position and the degree of opening of the control valve 13 change according to the steering wheel 11a, and the steering cylinder 14 extends or retracts leftward or rightward according to the position and the degree of opening of the control valve 13, making it possible to change the steering direction of the front wheels 7F. Note that the foregoing steering unit 11 is an example, and the foregoing configuration does not imply any limitations.

Figure 2:
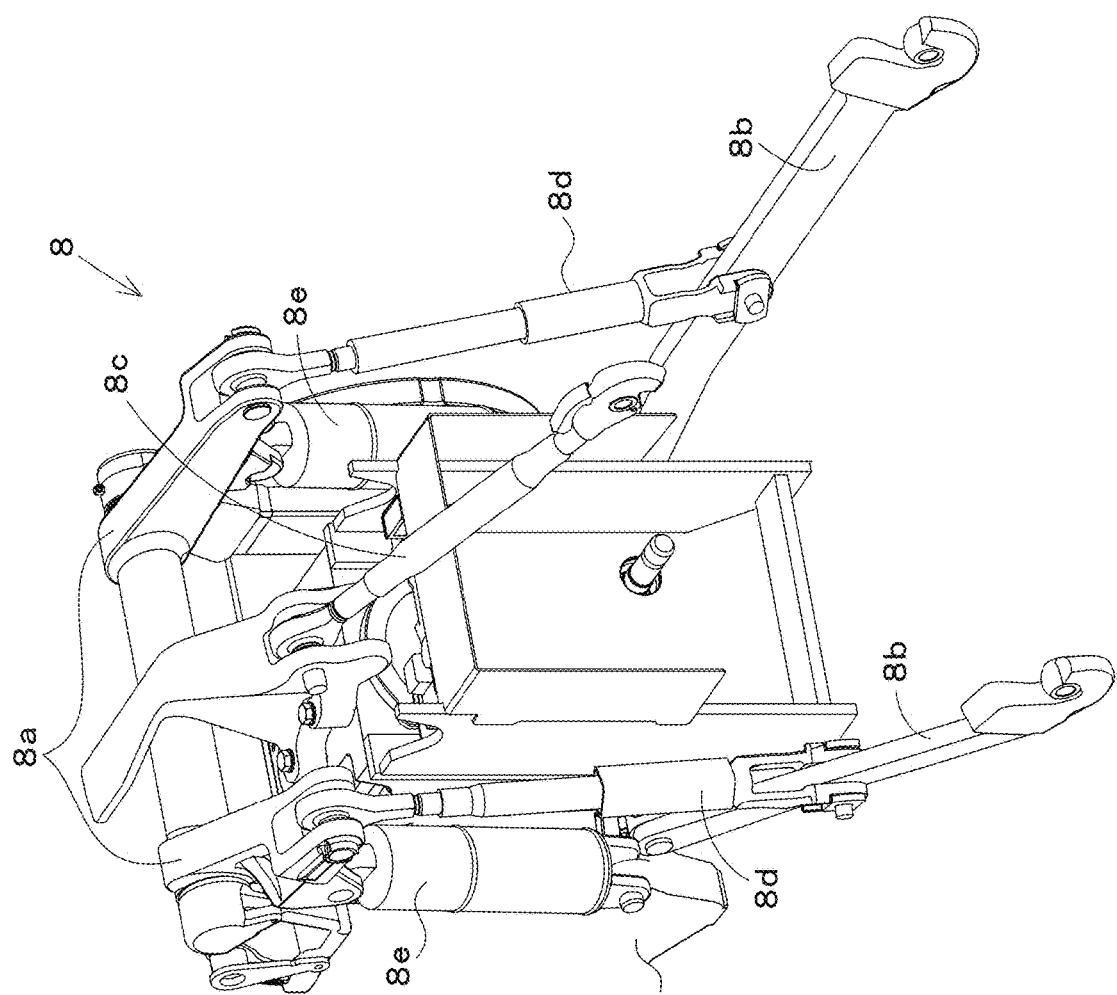
FIG. 2 illustrates a raising/lowering device.

The raising/lowering device 8 is described in detail. As illustrated in FIG. 2, the raising/lowering device 8 includes lift arms 8a, lower links 8b, a top link 8c, lift rods 8d, and lift cylinders 8e, and is capable of raising and lowering the working device 2. As illustrated in FIG. 1, a front end of each lift arm 8a is supported on an upper rear portion of a case (transmission case) housing the transmission 5 such that the lift arm 8a is swingable up and down. The lift arm 8a is driven by a corresponding lift cylinder 8e to swing (raised or lowered). The lift cylinder 8e includes a hydraulic cylinder. The lift cylinder 8e is connected to the hydraulic pump 12 via the control valve 16. The control valve 16 is a solenoid valve or the like to cause the lift cylinder 8e to extend and retract.

As illustrated in FIG. 1, a front end of each lower link 8b is supported on a lower rear portion of the transmission 5 such that the lower link 8b is swingable up and down. A front end of the top link 8c is supported, at a position higher than the lower link 8b, on a rear portion of the transmission 5 such that the top link 8c is swingable up and down. Each lift rod 8d connects a corresponding lift arm 8a and a corresponding lower link 8b. The working device 2 is linked to rear portions of the lower links 8b and the top link 8c. When the lift cylinders 8e are driven (extend or retract), the lift arms 8a ascend or descend, and the lower links 8b connected to the lift arms 8a via the lift rods 8d also ascend or descend. With this, the raising/lowering device 8 is capable of switching between a non-working position in which the working device 2 is in a raised position and a working position in which the working device 2 is in a lowered position, and the working device 2 swings up or down (raised or lowered) about front portions of the lower links 8b.

As illustrated in FIG. 1, the working machine 1 includes a display device 30. The display device 30 includes a display unit 31 including a liquid crystal panel, a touchscreen, or some other panel, and a storage device 32. The display unit 31 is configured to display not only information to assist the working machine 1 in traveling but also various types of information regarding the working machine 1. The storage device 32 is a nonvolatile memory, for example, and stores, for example, information to be displayed on the display unit 31. Furthermore, the display device 30 is connected to apparatus(es) of the working machine 1 communicably in a wired or wireless manner.

Figure 3:
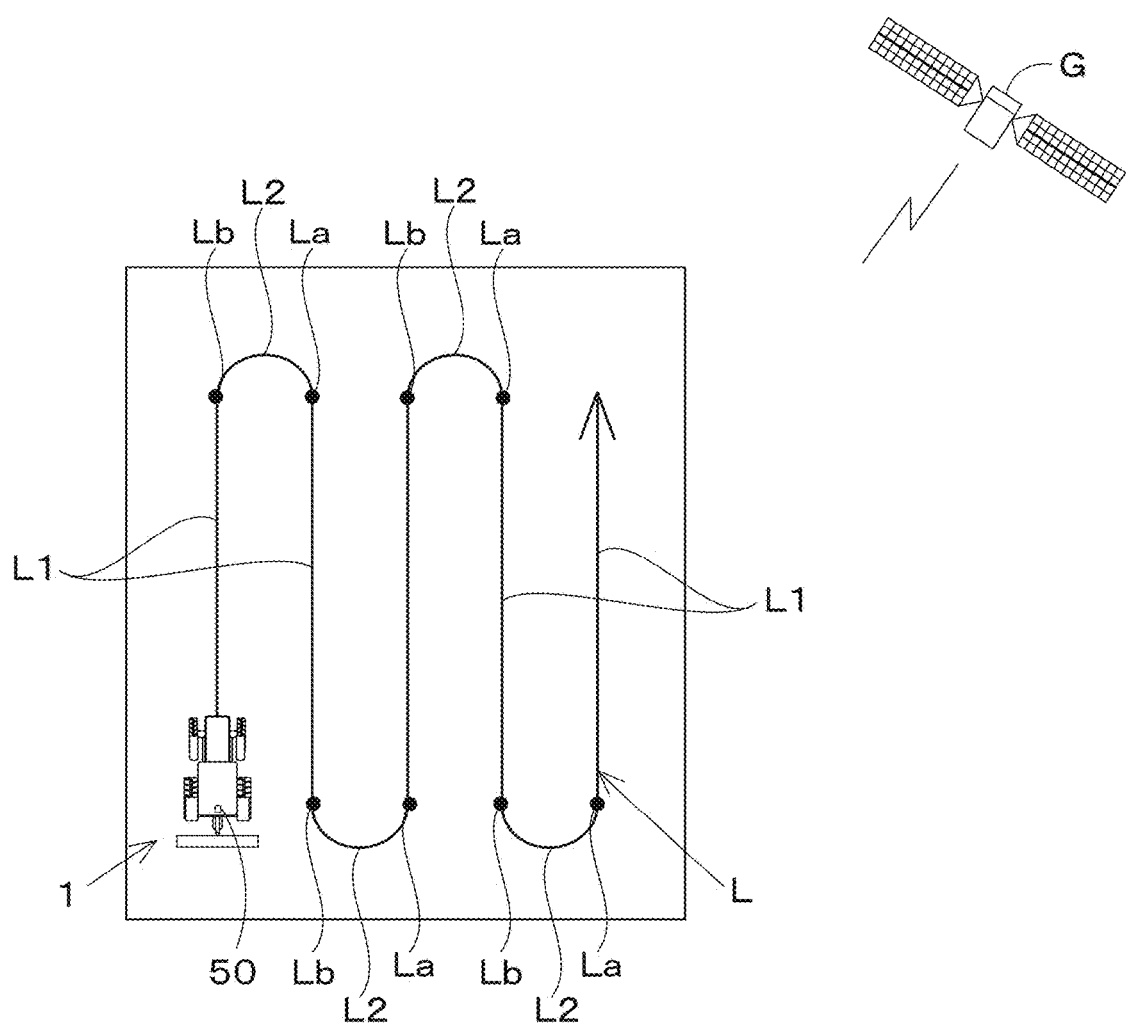
FIG. 3 illustrates how the working machine performs automatic travel.

As illustrated in FIG. 3, the working machine 1 is capable of performing automatic travel according to a predetermined planned travel route L and raising and lowering the working device 2 via the raising/lowering device 8.

As illustrated in FIG. 1, the working machine 1 includes a position detecting device 50. The position detecting device 50 is a device to detect the position of the machine body 3. In the present preferred embodiment, the position detecting device 50 is, for example, a positioning device. The position detecting device 50 is capable of detecting the position thereof (measured position information including latitude and longitude) by a satellite positioning system (positioning satellites G) such as D-GPS, GPS, GLONASS, BeiDou, Galileo, and/or Michibiki. Specifically, the position detecting device 50 receives satellite signals (positions of positioning satellites G, time of transmission, correction information, for example) from the positioning satellites G, and detects the position (e.g., latitude and longitude) of the working machine 1 (machine body 3), i.e., a machine body position W1, based on the satellite signals. As illustrated in FIG. 1, the position detecting device 50 includes a receiver 51 and an inertial measurement unit (IMU) 52. The receiver 51 is a device which includes an antenna, for example, and which receives satellite signals from the positioning satellites G, and is attached to the machine body 3 independently of the inertial measurement unit 52. In the present preferred embodiment, the receiver 51 is attached to an upper portion of a cabin (protection mechanism) 9 provided on the machine body 3. Note that the location at which the receiver 51 is attached is not limited to that described above, and may be a central portion of a hood. In the case where a rollover protection structure (ROPS) is provided on the machine body 3, the receiver 51 may be attached to an upper portion of the ROPS.

The inertial measurement unit 52 includes an acceleration sensor to detect the acceleration a of the machine body 3 and a gyroscope sensor to detect the angular velocity of the machine body 3, for example. The inertial measurement unit 52 is provided on the machine body 3, for example, below the operator's seat 10, and is capable of detecting the roll angle, pitch angle, yaw angle, of the machine body 3.

Note that, although the position detecting device 50 in the present preferred embodiment is a position detecting device 50 that detects the position of the machine body 3 based on satellite signals, the position detecting device 50 is not limited to the configuration as described above, provided that the position detecting device 50 is capable of detecting the position of the machine body 3. The position detecting device 50 may be one that detects the position of the machine body 3 based on the acceleration a detected by the inertial measurement unit 52 and prescribed position information.

As illustrated in FIG. 1, the working machine 1 includes a control device 60 and a storage unit 62. The control device 60 is a device to control a traveling system of the working machine 1 and control a working system of the working machine 1, for example. The storage unit 62 is, for example, a nonvolatile memory, and stores various types of information regarding control by the control device 60.

As illustrated in FIG. 1, the steering unit 11 includes an auto-steerer 17. The auto-steerer 17 is a mechanism to perform automatic steering of the machine body 3, and automatically steers the machine body 3 based on a planned travel route L and a machine body position W1 detected by the position detecting device 50. The auto-steerer 17 includes a steering motor 17a and a gear mechanism 17b. The steering motor 17a is a motor whose direction of rotation, speed of rotation, angle of rotation, for example, can be controlled based on the machine body position W1. The gear mechanism 17b includes a gear which is provided on the rotation shaft 11b and which rotates together with the rotation shaft 11b, and a gear which is provided on the rotation shaft 11b of the steering motor 17a and which rotates together with the rotation shaft 11b. As the rotation shaft 11b of the steering motor 17a rotates, the rotation shaft 11b automatically rotates (pivots) via the gear mechanism 17b, making it possible to change the steering direction of the front wheels 7F so that the machine body position W1 matches the planned travel route L.

As illustrated in FIG. 1, the control device 60 includes an automatic travel control unit 60a to control the machine body 3 based on the machine body position W1 detected by the position detecting device 50 and the planned travel route L, that is, control the automatic travel of the working machine 1. The automatic travel control unit 60a includes electrical/electronic circuit(s) in the control device 60 and/or program(s) stored in a CPU in the control device 60, for example. The automatic travel control unit 60a is capable of controlling the speed stage of the transmission 5, the rotation speed of the prime mover 4, the auto-steerer 17, and the like, and controls the automatic travel of the machine body 3 based on the machine body position W1 detected by the position detecting device 50 and the planned travel route L.

The automatic travel control unit 60a controls, after the start of automatic travel, the steering motor 17a so that the machine body 3 travels along the planned travel route L. The automatic travel control unit 60a, after the start of automatic travel, automatically changes, for example, the speed stage of the transmission 5 and/or the rotation speed of the prime mover 4 to control the vehicle speed (travel speed) of the working machine 1.

As illustrated in FIG. 3, the planned travel route L includes a plurality of straight sections L1 on which the machine body 3 travels straight. The planned travel route L also includes connecting section(s) L2 each of which connects an end point Lb of one of the plurality of straight sections L1 and a start point La of another of the plurality of straight sections L1. In the present preferred embodiment, the connecting sections L2 are turn sections on which the machine body 3 turns. The automatic travel control unit 60a, after the start of automatic travel, performs control so that different travel speeds are usable in the straight sections L1 and the turn sections L2, respectively. For example, in the straight sections L1, the automatic travel control unit 60a sets the travel speed to a speed v1. On the other hand, in the turn sections L2, the automatic travel control unit 60a sets the travel speed to a speed v2 that is lower than the speed v1 (v2 is greater than v1). Note that any of the straight sections L1 may be divided into a plurality of segments and the automatic travel control unit 60a may set different travel speeds in the respective segments. The control of the travel speed is not limited to the above-described configuration.

Furthermore, the automatic travel control unit 60a, after the start of automatic travel, controls the raising/lowering device 8 to be in different positions in the straight sections L1 and the turn sections L2, respectively. For example, in the straight sections L1, the automatic travel control unit 60a sets the raising/lowering device 8 to be in a working position. On the other hand, in the turn sections L2, the automatic travel control unit 60a sets the raising/lowering device 8 to be in a non-working position.

Figure 4:
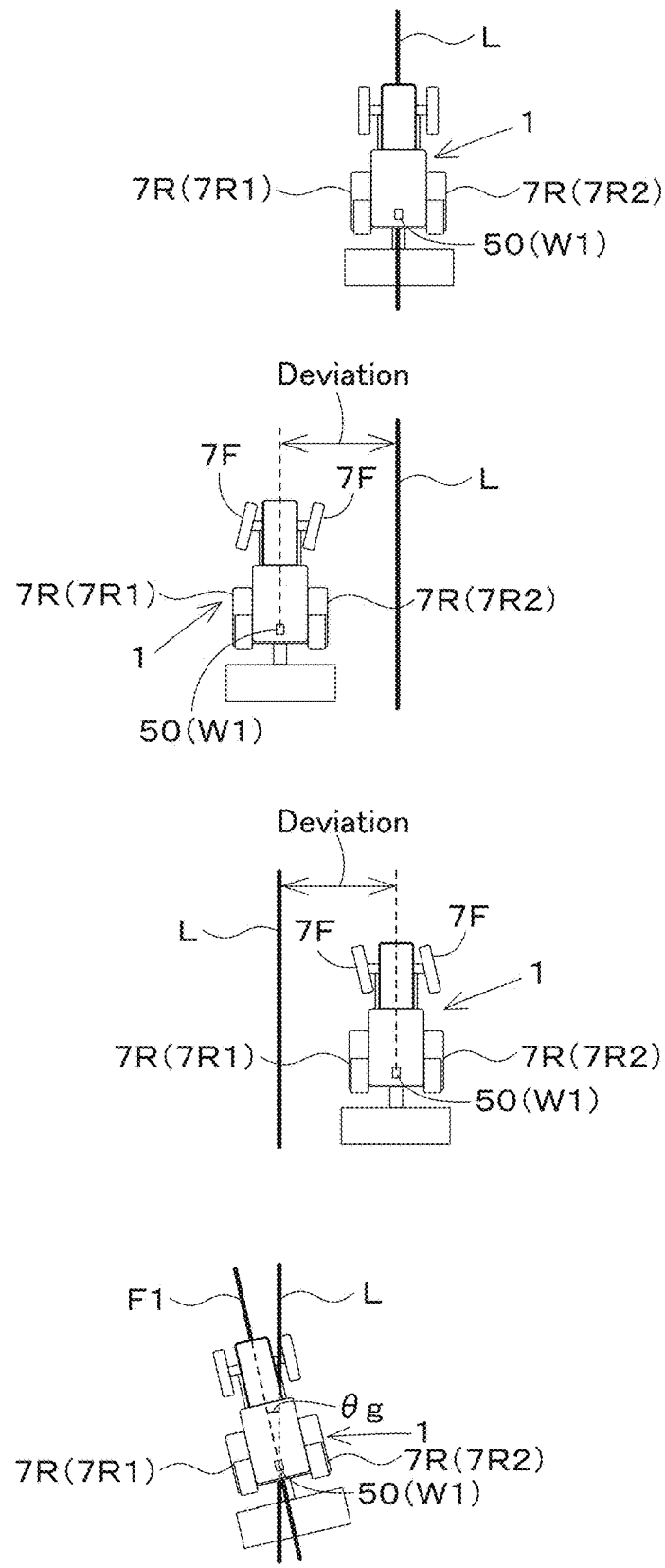
FIG. 4 illustrates automatic travel.

As illustrated in FIG. 4, under the conditions in which the working machine 1 is performing automatic travel, the automatic travel control unit 60a performs control so that the machine body 3 travels along the planned travel route L. That is, if the deviation between the machine body 3 and the planned travel route L is less than a predetermined set value, the automatic travel control unit 60a maintains the angle of rotation of the rotation shaft 11b. If the deviation between the machine body 3 and the planned travel route L is equal to or greater than the set value, the automatic travel control unit 60*a* causes the rotation shaft 11*b* to rotate so that the deviation is zero.

Specifically, if the deviation (deviation in position) between the machine body position W1 and the planned travel route L is less than a predetermined set value, the automatic travel control unit 60*a* maintains the angle of rotation of the rotation shaft 11*b*. On the contrary, if the deviation in position between the machine body position W1 and the planned travel route L is equal to or greater than the set value and the working machine 1 is positioned leftward of the planned travel route L, the automatic travel control unit 60*a* causes the rotation shaft 11*b* to rotate so that the working machine 1 is steered right. If the deviation in position between the machine body position W1 and the planned travel route L is equal to or greater than the set value and the working machine 1 is positioned rightward of the planned travel route L, the automatic travel control unit 60*a* causes the rotation shaft 11*b* to rotate so that the working machine 1 is steered left.

Note that, although the angle of steering by the steering unit 11 is changed based on the deviation in position between the machine body position W1 and the planned travel route L in the above preferred embodiment, the automatic travel control unit 60*a* may, in the case where the direction of the planned travel route L and the travel direction of the working machine 1 (machine body 3) (machine body heading direction) F1 differ from each other, i.e., in the case where an angle (deviation in direction) θ$g$ of the machine body heading direction F1 to the planned travel route L is equal to or greater than a set value, set the angle of steering so that the angle θ$g$ is zero (the machine body heading direction F1 matches the direction of the planned travel route L). The automatic travel control unit 60*a* may set the final angle of steering for the automatic travel based on an angle of steering determined based on the deviation (deviation in position) and an angle of steering determined based on directions (deviation in direction). Settings of the angle of steering in automatic travel in the above-described preferred embodiments are examples, and do not imply any limitation.

Figure 5A:
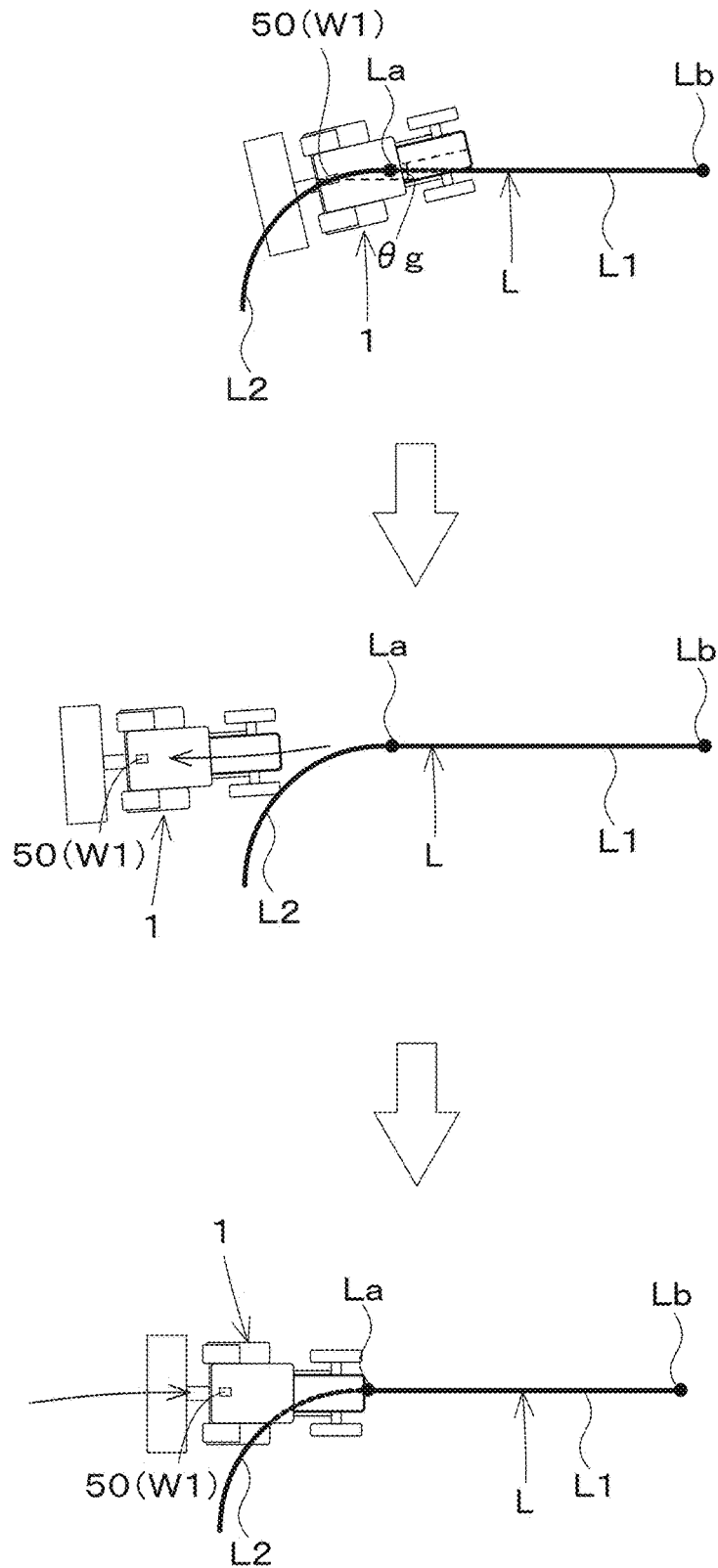
FIG. 5A illustrates a three-point-turn movement of the working machine.

As illustrated in FIG. 5A, the automatic travel control unit 60*a* causes the machine body 3 to perform a recovery movement to make the deviation between the position of the machine body 3 (machine body position) W1 detected by the position detecting device 50 and the planned travel route L less than a predetermined threshold when the machine body 3 is at a start point La of a straight section L1 or is about to enter the start point La of the straight section L1. Specifically, the automatic travel control unit 60*a* causes the machine body 3 to travel rearward and forward to make a three-point turn (hereinafter referred to as a three-point-turn movement) to make the deviation less than the threshold at a position short of the start point La of the straight section L1 or at the start point La. In the present preferred embodiment, if the angle (deviation in direction) θ$g$ of the machine body heading direction F1 to the straight section L1 is equal to or greater than the threshold, the automatic travel control unit 60*a* causes the machine body 3 to perform a three-point-turn movement so that the angle θ$g$ is zero (the machine body heading direction F1 matches the direction of the planned travel route L).

Specifically, when the machine body position W1 is located at a position short of the start point La of the straight section L1 or located at the start point La and the deviation in direction θ$g$ is equal to or greater than a threshold, as illustrated in the middle part of FIG. 5A, the automatic travel control unit 60*a* sets the angle of steering so that the deviation in direction θ$g$ approaches zero and switches the transmission 5 to rearward travel to cause the machine body 3 to travel a predetermined distance rearward (short rearward travel).

Furthermore, after causing the machine body 3 to travel a predetermined distance rearward, the automatic travel control unit 60*a* sets the angle of steering so that the deviation in direction θ$g$ further approaches zero, and, as illustrated in the lower portion of FIG. 5A, switches the transmission 5 to forward travel and causes the machine body 3 to travel a predetermined distance forward to move to the position short of the start point La of the straight section L1 or to the start point La (short forward travel). The automatic travel control unit 60*a* repeats the short rearward travel and the short forward travel until the deviation in direction θ$g$ from the straight section L1 is less than the threshold.

Figure 5B:
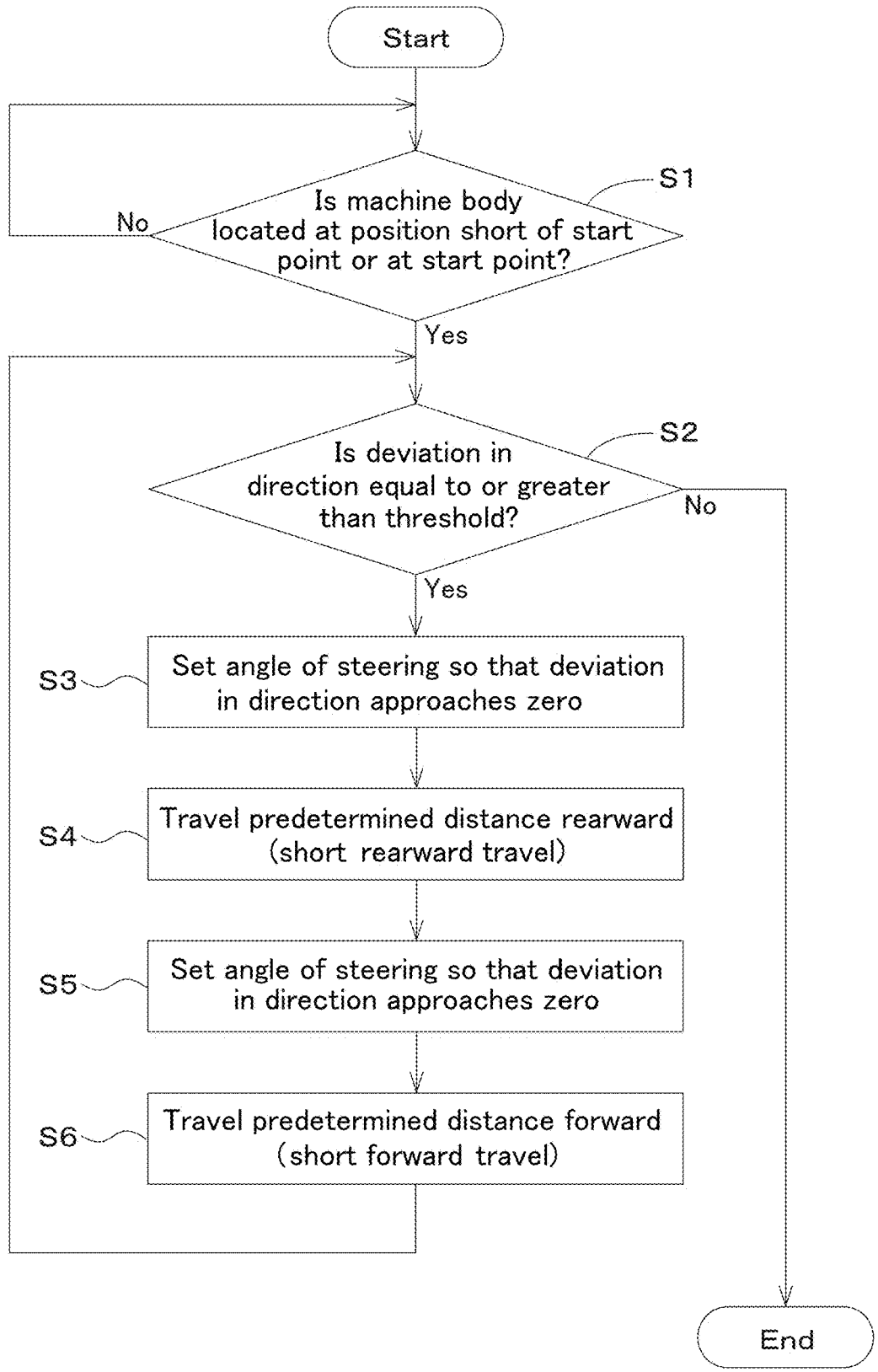
FIG. 5B is a chart showing a flow of the three-point-turn movement of the working machine.

A flow of the three-point-turn movement of the machine body 3 caused by the automatic travel control unit 60*a* is discussed. As shown in FIG. 5B, the automatic travel control unit 60*a* determines, based on the machine body position W1 and the planned travel route L, whether or not the machine body position W1 detected by the position detecting device 50 during automatic travel is located at a position short of a start point La of a straight section L1 or at the start point La (S1). If the automatic travel control unit 60*a* determines that the machine body position W1 is located at a position short of a start point La of a straight section L1 or at the start point La (Yes in S1), the automatic travel control unit 60*a* determines whether or not the deviation in direction θ$g$ is equal to or greater than a threshold (S2). If the automatic travel control unit 60*a* determines that the deviation in direction θ$g$ is equal to or greater than a threshold (Yes in S2), the automatic travel control unit 60*a* sets the angle of steering so that the deviation in direction θ$g$ approaches zero (S3), and switches the transmission 5 to rearward travel to cause the machine body 3 to travel a predetermined distance rearward (S4, short rearward travel). After causing the machine body 3 to travel a predetermined distance rearward (S4), the automatic travel control unit 60*a* sets the angle of steering so that the deviation in direction θ$g$ further approaches zero (S5), and switches the transmission 5 to forward travel and causes the machine body 3 to travel a predetermined distance forward to move to the position short of the start point La of the straight section L1 or to the start point La (S6, short forward travel).

After the automatic travel control unit 60*a* has caused the machine body 3 to travel a predetermined distance rearward (S4), the flow proceeds to S2, and the automatic travel control unit 60*a* determines whether or not the deviation in direction θ$g$ is equal to or greater than the threshold (S2). Thus, the automatic travel control unit 60*a* repeats the short rearward travel and the short forward travel until the deviation in direction θ$g$ from the straight section L1 becomes less than the threshold.

If the automatic travel control unit 60*a* determines that the deviation in direction θ$g$ is less than the threshold (No in S2), the automatic travel control unit 60*a* ends the three-point-turn movement.

Note that, although the working machine 1 performs the three-point-turn movement based on the angle (deviation in direction) θ$g$ of the machine body heading direction F1 to the planned travel route L in the above-described preferred embodiment, the method for the three-point-turn movement is not limited to that described above. The automatic travel control unit 60*a* may control the three-point-turn movement as follows: in the case where the deviation in position between the machine body position W1 and the planned travel route L at a position short of the start point La or at the start point La is equal to or greater than a threshold, the automatic travel control unit 60a sets the angle of steering so that the deviation in position is zero (the machine body heading direction F1 matches the direction of the planned travel route L). The automatic travel control unit 60a may control the three-point-turn movement by setting the angle of steering for automatic travel based on an angle of steering determined based on the deviation in position and an angle of steering determined based on the deviation in direction. The three-point-turn movement (recovery movement) in automatic travel in the above-described preferred embodiments is an example, and does not imply any limitation.

As illustrated in FIG. 1, the control device 60 includes a threshold setting unit 60b to set a threshold for the three-point-turn movement according to work. The work is, for example, work that can be done by the working device 2 linked to the raising/lowering device 8. The threshold setting unit 60b includes, for example, electrical/electronic circuit(s) and/or program(s) stored in a CPU, for example. Note that, although the threshold setting unit 60b includes electrical/electronic circuit(s) of the control device 60 and/or program(s) stored in a CPU of the control device 60 in the present preferred embodiments, the threshold setting unit 60b may include electrical/electronic circuit(s) of some other apparatus other than the control device 60 such as the display device 30 and/or program(s) stored in a CPU, for example.

Figure 6A:
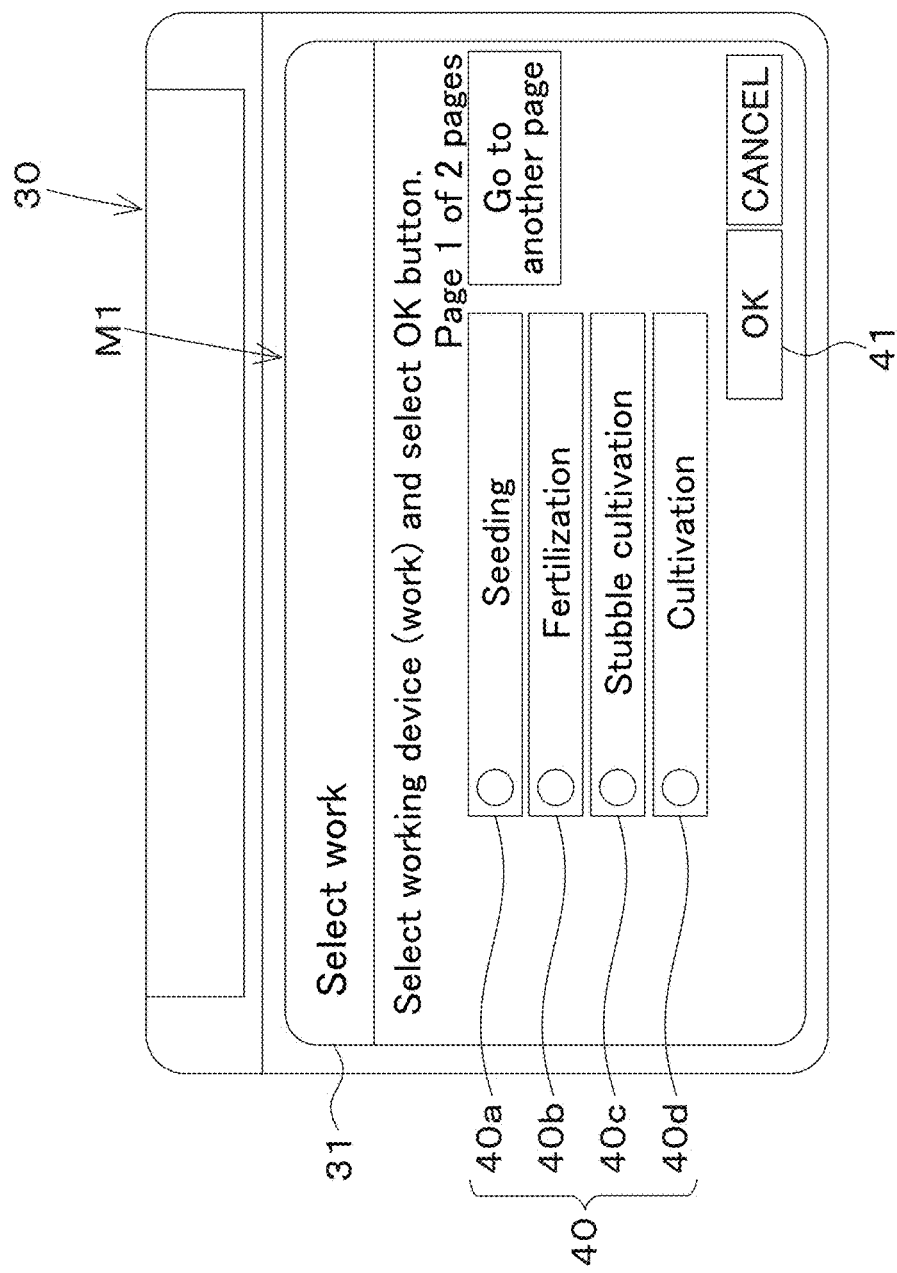
FIG. 6A illustrates an example of a selection screen displayed on a display unit.

The working machine 1 includes selection member(s) 40 via which work can be selected. The threshold setting unit 60b sets a threshold according to the work selected via any of the selection member(s) 40. Work that can be selected via the selection member(s) 40 is, for example, work that can be done by the working device 2 linked to the raising/lowering device 8. Note that, although work that can be selected via the selection member(s) 40 is, for example, work that can be done by the working device 2 linked to the raising/lowering device 8 in the present preferred embodiment, the work that can be selected via the selection member(s) 40 is not limited to the work that can be done by the working device 2 linked to the raising/lowering device 8. As illustrated in FIG. 6A, in the present preferred embodiment, the selection member(s) 40 is/are piece(s) of first graphics displayed on the display unit 31, and an operator can select work by performing the operation to select any of the selection member(s) 40. The selection member(s) 40 is/are displayed on a selection screen M1 of the display unit 31. The display unit 31 displays the selection screen M1 upon a predetermined operation on the display device 30, and the selection screen M1 displays a plurality of selection members 40 corresponding to types of work. In the present preferred embodiment, the selection members 40 indicate, as the types of work, work content (work categories) corresponding to working devices 2. The selection screen M1 also displays a first confirmation button 41 via which the selection of any of the selection members 40 is confirmed.

Note that the selection members 40 need only make it possible to select work. The selection of work may be performed by selecting a working device instead of selecting work content (work category), and the method of the selection is not limited to the method as described above.

In the case where the display device 30 is not an operable touchscreen or the like, the selection members 40 may be operation actuators (operation switches) which are provided on the display device 30 or the like and which are operable. The selection members 40 may be selection members 40 displayed on a PC or a mobile terminal such as a smartphone connected in a wireless or wired manner to the working machine 1. The above-described configuration does not imply any limitation.

At least two types of work can be selected via the selection members 40. The selection members 40 are associated with the types of work, and the selection members 40 input operation information into the control device 60. The types of work that can be selected via the selection members 40 include first work and second work for which less work accuracy (accuracy of work) is required than for the first work. In the present preferred embodiment, working devices 2 that can be selected via the selection members 40 include third work for which less work accuracy is required than for the first work but more work accuracy is required than for the second work, in addition to the first work and the second work. The first work to the third work correspond to one or more types of work content or one or more working devices.

For example, the first work includes seeding work done by a seeder, and the second work includes fertilization work done by a fertilizer spreader and/or stubble cultivation done by a stubble cultivator. Furthermore, the third work is, for example, cultivating work, which is work other than at least the seeding work, the fertilization work, and the stubble cultivation, and work for which less work accuracy is required than for the seeding work but more work accuracy is required than for the fertilization work and the stubble cultivation. In such a case, the selection members 40 (pieces of first graphics) displayed on the selection screen M1 of the display unit 31 include a first selection item 40a, a second selection item 40b, a third selection item 40c, and a fourth selection item 40d. The first selection item 40a corresponds to the seeding work which is the first work, and displays "seeding" which is the name corresponding to the seeding work. The second selection item 40b corresponds to the fertilization work which is the second work, and displays "fertilization" which is the name corresponding to the fertilization work. The third selection item 40c corresponds to stubble cultivation which is the second work, and displays "stubble cultivation" which is the name corresponding to the stubble cultivation. The fourth selection item 40d corresponds to the cultivating work which is the third work, and displays "cultivation" which is the name corresponding to the cultivating work.

Note that the types of work that can be selected via the selection members 40 need only include at least first work and second work for which less work accuracy is required than for the first work, and the types of work that can be selected via the selection members 40 are not limited to the above-described types, and the categories thereof are not limited to the above-described categories. For example, the first work may include spreading work done by a spreader, and the second work may include work to be done against the ground done by a ground implement. In such a case, for example, the first work is seeding work done by a seeder, agricultural chemical spreading done by an agricultural chemical spreader, or the like which is a type of spreading work, and the second work is stubble cultivation and cultivating work, for example.

The threshold setting unit 60b acquires a threshold from the storage device 32 based on the operation of any of the selection members 40, and sets the acquired threshold as a threshold for the three-point-turn movement. There are at least two thresholds having different values, which are set so as to correspond to the respective types of work. Specifically, the thresholds include a first threshold (e.g., 1 degree) corresponding to the first work and a second threshold (for example, 3 degrees) which corresponds to the second work and which is greater than the first threshold (the second threshold>the first threshold). The storage device 32 stores operation of each selection member 40 and a threshold such that the operation and the threshold are associated with each other. Specifically, the storage device 32 stores each type of work and a threshold such that the type of work and the threshold are associated with each other, and stores the first threshold and the second threshold.

In the present preferred embodiment, the thresholds include, in addition to the first threshold and the second threshold, a third threshold (e.g., 2 degrees) which differs from the first threshold and the second threshold and which corresponds to the third work. The third threshold is greater than the first threshold and is less than the second threshold (first threshold<third threshold<second threshold). The storage device 32 stores the first threshold, the second threshold, and the third threshold such that the first work is associated with the first threshold, the second work is associated with the second threshold, and the third work is associated with the third threshold.

Upon operation of the first confirmation button 41 with the first selection item 40a selected on the selection screen M1, information about operation of (operation information of) the first selection item 40a is inputted into the threshold setting unit 60b from the display device 30, and the threshold setting unit 60b acquires the first threshold from the storage device 32 and sets the first threshold as a threshold for the three-point-turn movement. Upon operation of the first confirmation button 41 with the second selection item 40b or the third selection item 40c selected on the selection screen M1, operation information of the second selection item 40b or the third selection item 40c is inputted into the threshold setting unit 60b from the display device 30, and the threshold setting unit 60b acquires the second threshold from the storage device 32 and sets the second threshold as a threshold for the three-point-turn movement. Upon operation of the first confirmation button 41 with the third selection item 40c selected on the selection screen M1, operation information of the third selection item 40c is inputted into the threshold setting unit 60b from the display device 30, and the threshold setting unit 60b acquires the third threshold from the storage device 32 and sets the third threshold as a threshold for the three-point-turn movement.

Note that the thresholds need only include values corresponding to types of work that can be selected via the selection members 40, and the values are not limited to the first threshold and the second threshold. The thresholds may include the foregoing third threshold. In the case where working devices 2 that can be selected via the selection members 40 include fourth work in addition to the first work to the third work, the thresholds include a fourth threshold in addition to the first to third thresholds.

Furthermore, the working machine 1 may include an input device 30 capable of receiving input of work accuracy, and the threshold setting unit 60b may correct a threshold according to the work accuracy inputted into the input device 30. The input device 30 is a device which is connected to the threshold setting unit 60b (control device 60) communicably in a wired or wireless manner and which is capable of receiving input of work accuracy. In the present preferred embodiment, the input device 30 is the display device 30, and work accuracy can be inputted by selecting any of pieces of second graphics 45 displayed on the display unit 31. Note that the input device 30 is not limited to the display device 30, and the input device 30 may be an operation actuator which is provided on the working machine 1 and which is operable or a PC or a mobile terminal such as a smartphone communicably connected to the working machine 1 in a wireless or wired manner. The foregoing configuration does not imply any limitation.

As illustrated in FIG. 6B, the input device 30 (display device 30) displays, on the display unit 31, the pieces of second graphics 45 which correspond to work accuracies and which are selectable and operable. Upon operation of any of the pieces of second graphics 45, a corresponding work accuracy is inputted into the threshold setting unit 60b. The pieces of second graphics 45 are displayed on an input screen M2 of the display unit 31. The display unit 31 displays the input screen M2 upon operation to select one of the selection members 40 on the selection screen M1, and the plurality of pieces of second graphics 45 corresponding to work accuracies are displayed on the input screen M2. Furthermore, the input screen M2 displays a second confirmation button 46 via which the input of a work accuracy is confirmed.

In the present preferred embodiment, the pieces of second graphics 45 indicate work accuracies corresponding to the first to third thresholds. The display device 30 includes, for example, a first input item 45a with "high accuracy" corresponding to the first threshold, a second input item 45b with "high efficiency" corresponding to the second threshold, and a third input item 45c with "normal" corresponding to the third threshold. The input screen M2 displays the pieces of second graphics 45 such that a piece of second graphics 45 corresponding to the threshold (one of the first to third thresholds) set by the threshold setting unit 60b is preselected. Upon operation of the second confirmation button 46 by an operator, the selection of the selected piece of second graphics 45 is confirmed.

For example, in the case where the first selection item 40a is selected on the selection screen M1 and the threshold set by the threshold setting unit 60b is the first threshold, the input screen M2 displays the first input item 45a corresponding to the first threshold in a preselected manner. In the case where the second selection item 40b or the third selection item 40c is selected on the selection screen M1 and the threshold set by the threshold setting unit 60b is the second threshold, the input screen M2 displays the second input item 45b corresponding to the second threshold in a preselected manner. In the case where the fourth selection item 40d is selected on the selection screen M1 and the threshold set by the threshold setting unit 60b is the third threshold, the input screen M2 displays the third input item 45c corresponding to the third threshold in a preselected manner. The input device 30 inputs the work accuracy into the threshold setting unit 60b based on the operation to select the selected piece of second graphics 45.

The storage device 32 stores work accuracies inputted from the input device 30 and thresholds such that the work accuracies are associated with the thresholds. The threshold setting unit 60b acquires a threshold from the storage device 32 based on the work accuracy inputted from the input device 30, and corrects the acquired threshold as a threshold for the three-point-turn movement.

Thus, upon operation of the second confirmation button 46 with the first input item 45a selected on the input screen M2, a work accuracy corresponding to the first input item 45a is inputted from the input device 30 into the threshold setting unit 60b, and the threshold setting unit 60b acquires the first threshold from the storage device 32 and corrects the first threshold as a threshold for the three-point-turn movement. Upon operation of the second confirmation button 46 with the second input item 45b or the third input item 45c selected on the input screen M2, a work accuracy corresponding to the second input item 45b or the third input item 45c is inputted from the input device 30 into the threshold setting unit 60b, and the threshold setting unit 60b acquires the second threshold from the storage device 32 and corrects the second threshold as a threshold for the three-point-turn movement. Upon operation of the second confirmation button 46 with the fourth input item selected on the input screen M2, a work accuracy corresponding to the fourth input item is inputted from the input device 30 into the threshold setting unit 60b, and the threshold setting unit 60b acquires the third threshold from the storage device 32 and corrects the third threshold as a threshold for the three-point-turn movement.

Note that the threshold setting unit 60b need only correct a threshold based on the work accuracy inputted from the input device 30, that the thresholds to be corrected are not limited to the first to third thresholds and may be different values, and that a method of correction is not limited to that described above. For example, the threshold setting unit 60b may correct a threshold by multiplying a threshold acquired from the storage device 32 based on the operation of one of the selection members 40 by a predetermined correction value a based on the work accuracy inputted from the input device 30. In such a case, for example, the correction value a for the second input item 45b (high accuracy) is about 0.8, the correction value a for the second input item 45b (high efficiency) is about 1.2, and the correction value a for the third input item 45c (normal) is about 1.0, and the correction values a are stored in the storage device 32 such that the correction values a are associated with the work accuracies inputted from the input device 30. Note that the values of the correction values a are mere examples, and not limited to the values described above.

The following description discusses a flow in which the threshold setting unit 60b sets a threshold for the three-point-turn movement. As shown in FIG. 7, first, upon a predetermined operation on the display device 30 by an operator, the display unit 31 displays the selection screen M1 (S11). When the display unit 31 has displayed the selection screen M1, the threshold setting unit 60b determines whether or not any of the selection members 40 has been operated and the first confirmation button 41 has been operated (S12). When the operator has operated any of the selection members 40 and has operated the first confirmation button 41, the threshold setting unit 60b determines that a selection member 40 has been operated and the first confirmation button 41 has been operated (Yes in S12), and determines whether or not the operated selection member 40 is a selection member 40 corresponding to the second work (S13). Specifically, the threshold setting unit 60b determines whether or not the operated selection member 40 is the second selection item 40b corresponding to fertilization work or the third selection item 40c corresponding to stubble cultivation.

As shown in FIG. 7, if the threshold setting unit 60b determines that the operated selection member 40 is a selection member 40 corresponding to the second work (the second selection item 40b or the third selection item 40c) (Yes in S13), the threshold setting unit 60b acquires the second threshold corresponding to the second work from the storage device 32 and sets the acquired second threshold as a threshold for the three-point-turn movement (S14).

As shown in FIG. 7, once the threshold setting unit 60b has set the second threshold as a threshold for the three-point-turn movement (S14), the display unit 31 displays the input screen M2 in which the piece of second graphics 45 corresponding to the second threshold (second input item 45b) is displayed in a preselected manner (S15). Once the display unit 31 has displayed the input screen M2 (S15), the threshold setting unit 60b determines whether or not the second confirmation button 46 has been operated (S16). Once the operator has operated a piece of second graphics 45 and has operated the second confirmation button 46 (Yes in S16), the threshold setting unit 60b acquires, from the storage device 32, a threshold corresponding to the piece of second graphics 45 corresponding to the work accuracy inputted into the input device (display device 30), i.e., a threshold corresponding to the piece of second graphics 45 selected by operation, and corrects the acquired threshold as a threshold for the three-point-turn movement (S17).

As shown in FIG. 7, if the threshold setting unit 60b determines that the operated selection member 40 is not the selection member 40 corresponding to the second work (not the second selection item 40b or the third selection item 40c) (No in S13), the threshold setting unit 60b determines whether or not the operated selection member 40 is a selection member 40 corresponding to the first work (S18). Specifically, the threshold setting unit 60b determines whether or not the operated selection member 40 is the first selection item 40a corresponding to seeding work.

As shown in FIG. 7, if the threshold setting unit 60b determines that the operated selection member 40 is the selection member 40 corresponding to the first work (first selection item 40a) (Yes in S18), the threshold setting unit 60b acquires the first threshold corresponding to the first work from the storage device 32, and sets the acquired first threshold as a threshold for the three-point-turn movement (S19).

As shown in FIG. 7, once the threshold setting unit 60b has set the first threshold as a threshold for the three-point-turn movement (S19), the display unit 31 displays the input screen M2 in which the piece of second graphics 45 corresponding to the first threshold (first input item 45a) is displayed in a preselected manner (S20). Once the display unit 31 has displayed the input screen M2 (S20), the flow proceeds to S16, and the threshold setting unit 60b determines whether or not the second confirmation button 46 has been operated (S16).

As shown in FIG. 7, if the threshold setting unit 60b determines that the operated selection member 40 is not the selection member 40 corresponding to the first work (not the first selection item 40a) (No in S18), that is, if the operated selection member 40 is a selection member 40 corresponding to the third work (fourth selection item 40d), the threshold setting unit 60b acquires the third threshold corresponding to the third work from the storage device 32, and sets the acquired third threshold as a threshold for the three-point-turn movement (S21).

As shown in FIG. 7, once the threshold setting unit 60b has set the third threshold as a threshold for the three-point-turn movement (S21), the display unit 31 displays the input screen M2 in which the piece of second graphics 45 corresponding to the third threshold (third input item 45c) is displayed in a preselected manner (S22). Once the display unit 31 has displayed the input screen M2 (S22), the flow proceeds to S16, and the threshold setting unit 60b determines whether or not the second confirmation button 46 has been operated (S16).

A working machine 1 as has been described includes a machine body 3 capable of traveling, a position detector 50 to detect a machine body position W1, and a controller 60 to control the machine body 3 based on the machine body position W1 detected by the position detector 50 and a planned travel route L, wherein the planned travel route L includes a plurality of straight sections L1 on which the machine body 3 travels straight, and the controller 60 is configured or programmed to include a threshold setter 60b to set a threshold according to work, and causes the machine body 3 to perform a recovery movement to make a deviation between the machine body position W1 detected by the position detector 50 and the planned travel route L less than the threshold when the machine body 3 is at a start point La of any of the straight sections L1 or is about to enter the start point La of the straight section L1. With this configuration, the threshold setter 60b sets a threshold for each work done by the working machine 1. This makes it possible for the working machine 1 to adjust work efficiency and work accuracy according to the content, category, or the like of work.

The working machine 1 further includes at least one selector 40 via which the work is capable of being selected, wherein the threshold setter 60b sets the threshold according to the work selected via the at least one selector 40. With this configuration, an operator can select desired work by operating the selector 40, making it possible to easily adjust work efficiency and work accuracy according to work.

First work and second work for which less work accuracy is required than for the first work are capable of being selected via the at least one selector 40, the threshold setter 60b sets a first threshold as the threshold upon selection of the first work via the at least one selector 40; and a second threshold as the threshold upon selection of the second work via the at least one selector 40, the second threshold being greater than the first threshold. With this configuration, it is possible to perform work efficiently by setting a threshold to a large value when work does not require accuracy to thereby reduce the number of times the machine body 3 performs the recovery movement.

The first work includes spreading work done by a spreader, and the second work includes work done by a ground implement. With this configuration, high accuracy can be maintained by setting the threshold to a small value in the case of work in which higher priority is placed on work accuracy than on work efficiency (e.g., spreading work such as seeding work) compared to work against the ground such as stubble cultivation work.

The first work includes seeding work done by a seeder, and the second work includes fertilization work done by a fertilizer spreader and/or stubble cultivation performed by a stubble cultivator. With this configuration, high accuracy can be maintained by setting the threshold to a small value in the case of work in which higher priority is placed on work accuracy than on work efficiency (e.g., seeding work) compared to fertilization work and stubble cultivation work.

The working machine 1 further includes an input 30 capable of receiving input of accuracy of the work, wherein the threshold setter 60b sets the threshold according to the work and corrects the threshold according to the accuracy of the work inputted into the input 30. This configuration makes it possible to correct (change) the threshold as needed in addition to the working device 2, and possible to improve convenience.

The recovery movement is a movement in which the machine body 3 makes a three-point turn. The three-point-turn movement of the machine body 3 may result in, for example, a decrease in work efficiency and large consumption of a power source such as fuel or battery of the machine body 3. With the above configuration, setting the threshold based on the working device 2 makes it possible to further improve work efficiency and achieve energy saving.

While preferred embodiments of the present invention have been described above, it is to be understood that variations and modifications will be apparent to those skilled in the art without departing from the scope and spirit of the present invention. The scope of the present invention, therefore, is to be determined solely by the following claims. For example, although the working machines 1 perform automatic travel according to the planned travel route L in the foregoing preferred embodiments, the working machines 1 may be configured such that automatic steering is performed without performing control of travel speed according to the planned travel route L.

What is claimed is:

1. A working machine comprising:
a machine body capable of traveling;
a position detector to detect a position of the machine body;
a controller to control the machine body based on the position of the machine body detected by the position detector and a planned travel route; and
an input operable to receive input of a level of accuracy of work; wherein
the planned travel route includes a straight section on which the machine body travels straight; and
the controller is configured or programmed to include a threshold setter to set a threshold according to the work, and cause the machine body to perform a recovery movement to make a deviation between the position of the machine body detected by the position detector and the planned travel route less than the threshold when the machine body is at a start point of the straight section or is about to enter the start point of the straight section; and
the threshold setter is configured or programmed to correct, using a correction value corresponding to the level of the accuracy of the work inputted into the input, the threshold to a smaller value when higher priority is placed on the accuracy of the work than on efficiency of the work and to a larger value when higher priority is placed on the efficiency of the work than on the accuracy of the work.

2. The working machine according to claim 1, further comprising at least one selector via which the work is capable of being selected; wherein
the threshold setter is configured or programmed to set the threshold according to the work selected via the at least one selector.

3. The working machine according to claim 2, wherein
first work and second work for which less work accuracy is required than for the first work are capable of being selected via the at least one selector;
the threshold setter is configured or programmed to set:
a first threshold as the threshold upon selection of the first work via the at least one selector; and
a second threshold as the threshold upon selection of the second work via the at least one selector, the second threshold being greater than the first threshold.

4. The working machine according to claim 3, wherein
the first work includes spreading work done by a spreader; and
the second work includes work done by a ground implement.

5. The working machine according to claim 3, wherein the first work includes seeding work done by a seeder; and the second work includes fertilization work done by a fertilizer spreader and/or stubble cultivation performed by a stubble cultivator.

6. The working machine according to claim 1, wherein the recovery movement is a movement in which the machine body makes a three-point turn.

* * * * *